United States Patent
Ghosh et al.

(10) Patent No.: US 11,442,284 B2
(45) Date of Patent: Sep. 13, 2022

(54) STRUCTURED LIGHT PROJECTOR INCLUDING AN INTEGRATED METALENS AND DIFFRACTIVE OPTICAL ELEMENT

(71) Applicant: ams Sensors Asia Pte. Ltd., Singapore (SG)

(72) Inventors: Chuni Ghosh, West Windsor, NJ (US); Jean-Francois Seurin, Princeton Junction, NJ (US); Maik Scheller, Eindhoven (NL); Baiming Guo, Eindhoven (NL)

(73) Assignee: AMS SENSORS ASIA PTE. LTD., Singapore (SG)

( * ) Notice: Subject to any disclaimer, the term of this patent is extended or adjusted under 35 U.S.C. 154(b) by 45 days.

(21) Appl. No.: 17/258,731

(22) PCT Filed: Jul. 23, 2019

(86) PCT No.: PCT/SG2019/050356
§ 371 (c)(1),
(2) Date: Jan. 7, 2021

(87) PCT Pub. No.: WO2020/022960
PCT Pub. Date: Jan. 30, 2020

(65) Prior Publication Data
US 2021/0286189 A1 Sep. 16, 2021

Related U.S. Application Data

(60) Provisional application No. 62/702,976, filed on Jul. 25, 2018.

(51) Int. Cl.
*G02B 27/42* (2006.01)
*G01B 11/25* (2006.01)

(52) U.S. Cl.
CPC ........ *G02B 27/425* (2013.01); *G01B 11/2513* (2013.01)

(58) Field of Classification Search
None
See application file for complete search history.

(56) References Cited

U.S. PATENT DOCUMENTS

| 2014/0376092 | A1 | 12/2014 | Mor |
| 2017/0219739 | A1 | 8/2017 | Lin et al. |
| 2018/0129866 | A1 | 5/2018 | Hicks et al. |
| 2018/0203247 | A1 | 7/2018 | Chen et al. |

OTHER PUBLICATIONS

International Search Report and Written Opinion for Application No. PCT/SG2019/050356 dated Oct. 1, 2019 (11 pages).
International Preliminary Report on Patentability for Application No. PCT/SG2019/050356 dated Feb. 4, 2021 (10 pages).

*Primary Examiner* — Elmito Breval
(74) *Attorney, Agent, or Firm* — Viering, Jentschura & Partner MBB

(57) ABSTRACT

An apparatus that includes a structured light projector which includes a light source, a metalens, and a diffractive optical element (DOE) multiplier. Each of the metalens and the DOE multiplier is integrated onto the light source. The structured light projector is operable such that light beams produced by the light source pass through the metalens and the DOE multiplier.

15 Claims, 2 Drawing Sheets

STRUCTURED LIGHT PROJECTOR INCLUDING AN INTEGRATED METALENS AND DIFFRACTIVE OPTICAL ELEMENT

CROSS-REFERENCE TO RELATED APPLICATION(S)

The present application is the U.S. national stage entry, under 35 U.S.C. § 371 of International Application No. PCT/SG2019/050356, filed Jul. 23, 2019, which claims the benefit of priority of U.S. Provisional Patent Application No. 62/702,976, filed on Jul. 25, 2018. The contents of the earlier application are incorporated herein by reference.

FIELD OF THE DISCLOSURE

The present disclosure relates to structured light projectors.

BACKGROUND

Structured light involves projecting a known pattern of light onto to a scene. The structured illumination may have any regular shape, e.g. lines or circles, or may have a pseudo-random pattern such as pseudo-random dot patterns or further may have pseudo-random shapes or sizes of shapes, depending on the application. A light pattern created in the scene by the structured light makes it possible to distinguish objects according to their distance from the apparatus emitting the structured light.

SUMMARY

The present disclosure describes an apparatus that includes a structured light projector. The structured light projector includes a light source, a metalens, and a diffractive optical element (DOE) multiplier. Each of the metalens and the DOE multiplier is integrated onto the light source. The structured light projector is operable such that light beams produced by the light source pass through the metalens and DOE multiplier.

Some implementations include one or more of the following features. For example, in some instances, the DOE multiplier and the metalens are disposed on the same surface or in the same plane as one another. In other instances, the DOE multiplier and the metalens are disposed in different planes from one another. In some cases, the DOE multiplier is disposed directly on an output face of the light source.

A spacer can be provided on the DOE multiplier, such that the metalens is disposed on a surface of the spacer and such that the spacer separates the metalens from the DOE multiplier. In some cases, the DOE multiplier and metalens are on a surface of the spacer such that the spacer separates the DOE multiplier and metalens from the output face of the light source. The spacer can be composed, for example, of an epitaxial or polymer layer. The spacer may be bonded, for example, to the output face of the light source. In some instances, a lateral dimension of the metalens is less than a corresponding lateral dimension of the DOE multiplier. In some implementations, an envelope profile of the metalens is the same as a two-dimensional grating profile of the DOE multiplier. In some case, the surface of the spacer on which the DOE multiplier and metalens are disposed is larger than the output face of the light source.

In some implementations, the light source include one or more VCSELs.

In some instances, by integrating the metalens and the DOE multiplier onto the light source, a highly compact projector can be obtained. This can be important, for example, where the structured light projector is incorporated into a portable computing device such as a smartphone.

Other aspects, features and advantages will be readily apparent from the following detailed description, the accompanying drawings, and the claims.

DETAILED DESCRIPTION

Figure 1:
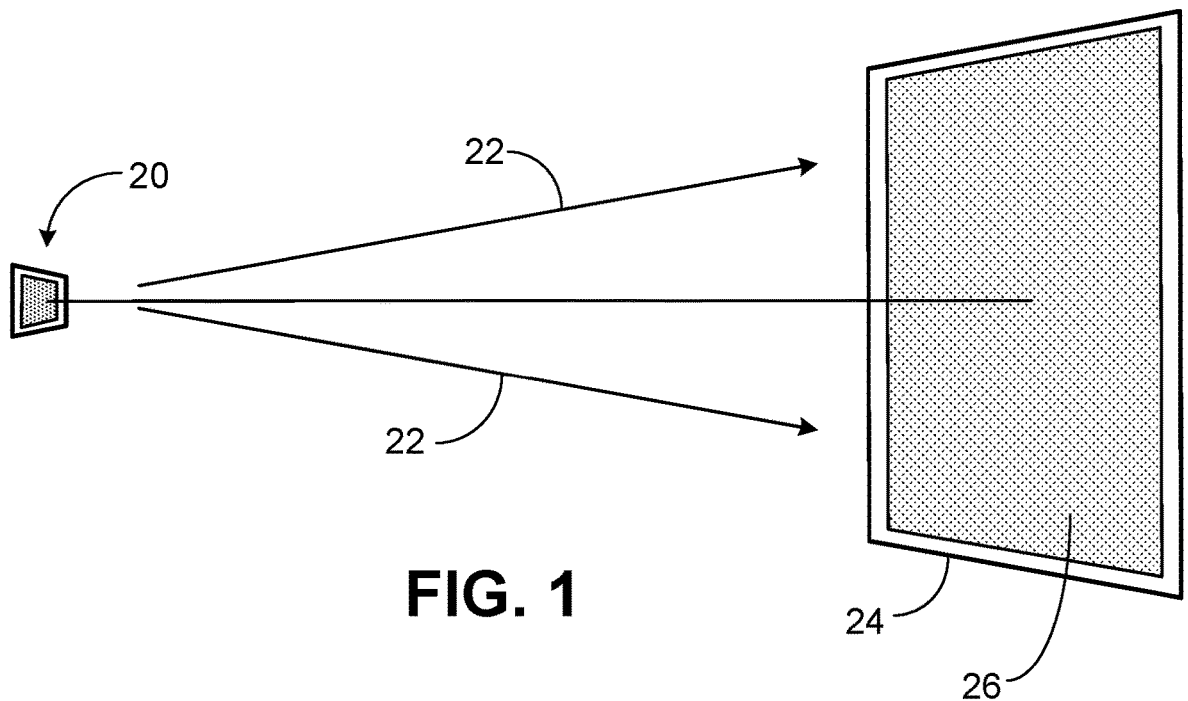
FIG. 1 illustrates an example of a structured light projector system.

FIG. 1 illustrates an example of a structured light projector 20 that includes a metalens and a diffractive optical element (DOE) multiplier, both of which are integrated onto a light source, such as a low divergence vertical cavity surface emitting laser (VCSEL) or array of VCSELs. The DOE multiplier is operable to multiply each source element beam by splitting the beams in an energy efficient manner to produce multiple beams from each source element (e.g., VCSEL). Thus, the DOE multiplier operates as a beam splitter that separates each incident beam into multiple non-overlapping beams. The intervals, intensity ratios and symmetrical distribution of the beams are set by the periodic microstructures of the DOE multiplier. The divergence angle, diameter and polarization of the incident beam remain substantially unchanged. The DOE multiplier can diffract the VCSEL source element beam into a regular or non-regular angular array of beams, depending on the particular implementation. On the other hand, the metalens is operable to imprint an arbitrary phase profile on the individual beams. The metalens defines a metasurface composed of sub-wavelength-spaced phase shifters at an interface, which allows for tight control over the light properties. In combination, the DOE multiplier and metalens allow the projector 20 to generate a structured light pattern (e.g. a pattern of spots). By integrating the metalens and the DOE multiplier onto the light source, a highly compact projector can be obtained in some instances.

As shown in FIG. 1, at least some of the light beams 22 produced by the projector 20 may be incident on a scene 24. The light beams 22 impinging on the scene 24 create a pattern 26 that can be sensed and processed, for example, by a structured light imaging system to derive a three-dimensional depth map of one or more objects in the scene. Particular examples and further details of the structured light projector 20 according to some implementations are described below.

Figure 2:
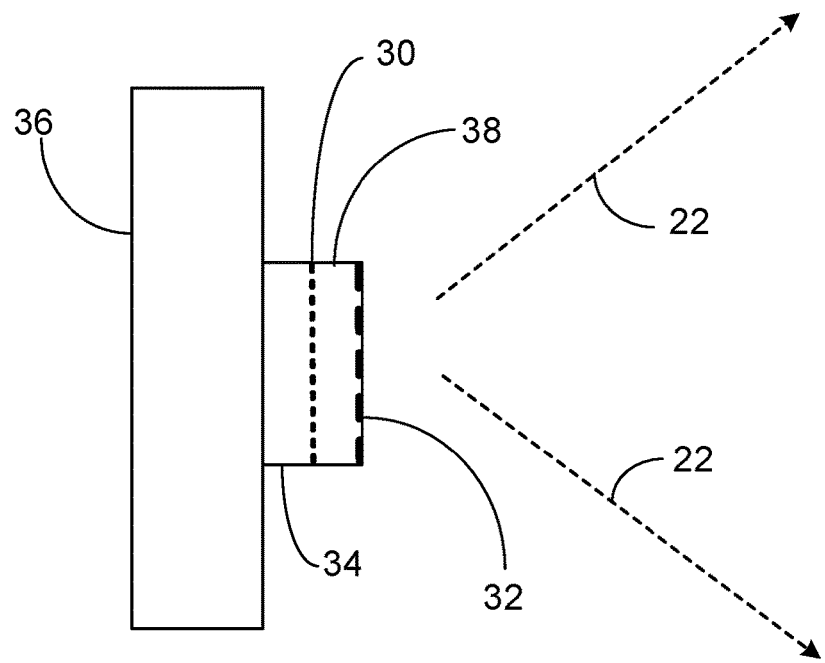
FIG. 2 illustrates a first example of a structured light projector including a DOE multiplier and metalens integrated onto a light source.

In some instances, as shown in FIG. 2, the DOE multiplier 30 and the metalens 32 are disposed in different planes from one another. In the illustrated example, the DOE multiplier 30 is fabricated directly on an output face of a VCSEL or an array 34 of VCSELs disposed on a submount 36. A regrown epitaxial layer or a spin-on polymer layer, for example, can be provided as a spacer 38 on the DOE multiplier 30. The metalens 40 then can be fabricated on the surface of the spacer 38 to form a fully integrated structured light projector 20 in which the VCSEL beams pass through the DOE multiplier 30 and the metalens 32. The foregoing configuration, in which the DOE multiplier 30 is in a plane closer to the array 34 of VCSELs than is the plane of the metalens 32, can be useful for projecting a relatively small field of illumination. To project a larger field of illumination, the metalens 32 can be disposed in a plane closer to the array 34 of VCSELs than is the plane of the DOE multiplier 30.

Figure 3:
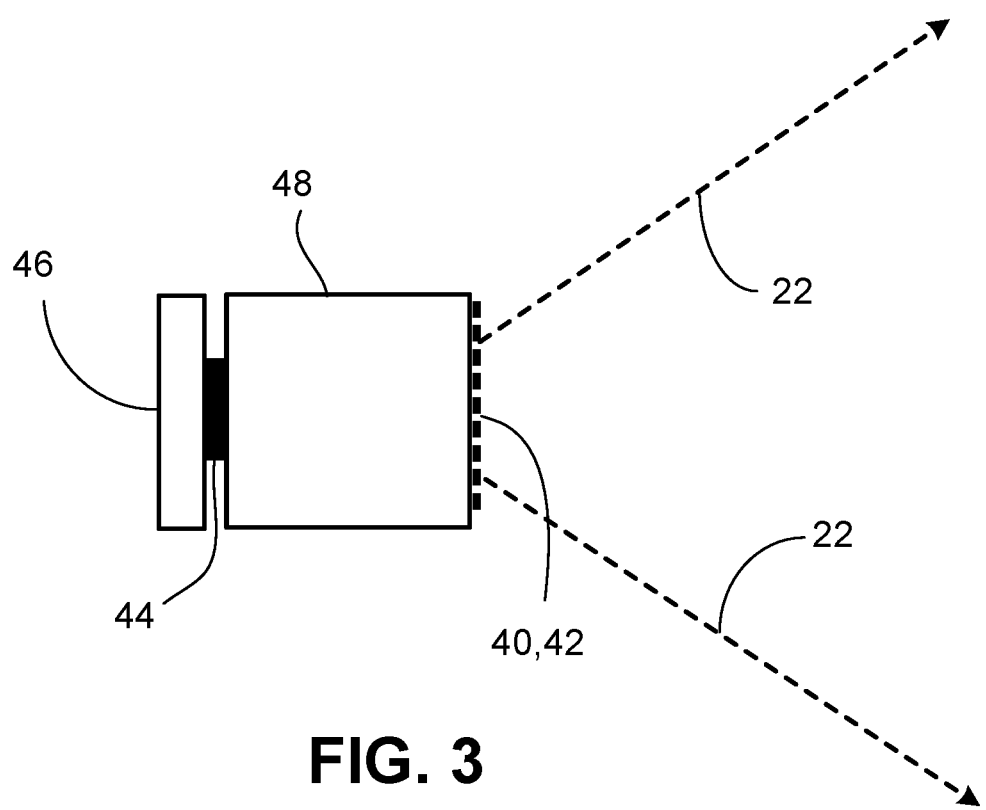
FIG. 3 illustrates another example of a structured light projector including a DOE multiplier and metalens integrated onto a light source.
Figure 4:
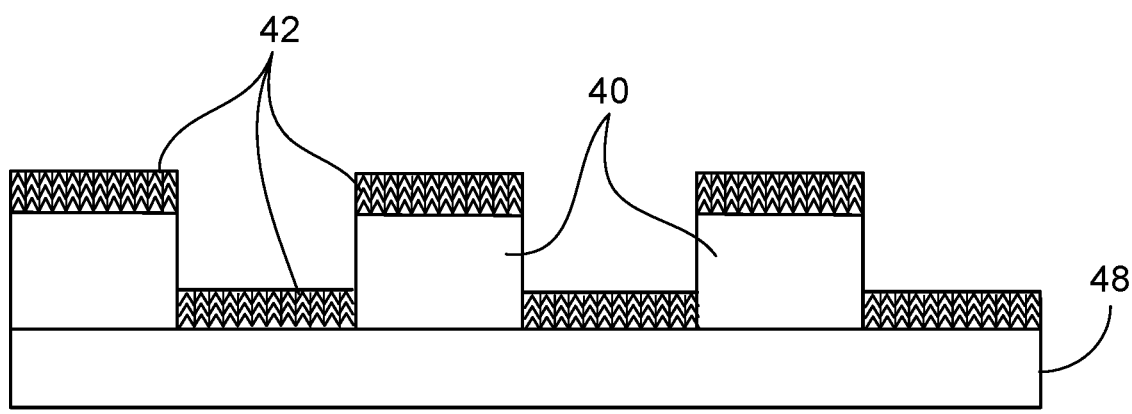
FIG. 4 illustrates further details of the DOE multiplier and metalens according to some implementations.

In other instances, as shown in FIGS. 3 and 4, both the DOE multiplier 40 and the metalens 42 are manufactured on the same surface and may be disposed in the same plane. For example, the DOE multiplier 40 and metalens 42 can be fabricated on the surface of a glass or other transparent spacer 48, that subsequently is attached (e.g., bonded) directly to the output face of a VCSEL or an array 44 of VCSELs disposed on a submount 46. In some instances, the spacer 48 initially may be attached to the output face of the VCSEL(s) and the DOE multiplier and metalens subsequently are formed on the spacer surface.

Typically, the lateral dimension of the metalens 42 (e.g., on the order of 100 nm) is much less than the corresponding lateral dimension of the DOE multiplier 40. In some cases, the envelope profile of the metalens 42 is about the same as the two-dimensional grating profile of the DOE multiplier 40. The surface of the spacer 48 on which the DOE multiplier 40 and metalens 42 are formed can be larger than the output face of the VCSEL or VCSEL array, thereby providing sufficient surface area for both the DOE multiplier 40 and metalens 42 to be formed on the same surface. In a particular example, the beam divergence, after collimation by the metalens 32, is about 4 mrad, and the beam diameter is about 7-8 µm. For such values, a lens focal length (FL) of about 2 mm is suitable. The thickness of the spacer 48 should be about FL*n, where n is the refractive index of the spacer.

In some implementations, the metalenses 32 has a flat surface composed of nanostructures. In some instances, for example, the metalens 32 is composed of nanofins. The desired phase can be imparted, for example, by appropriate rotation of the nanofins.

In implementations in which the light source includes an array of light emitting elements, the VCSEL array layout can take the form of a regular or non-regular array. In some cases, there may groups of regular and/or non-regular arrays. The array can have separately addressable source elements or groups of source elements (e.g., VCSELs). Further, a respective DOE multiplier can be integrated onto the face of each light source element (e.g., VCSEL). Each DOE multiplier can be designed to produce an array of multiple beams with the same layout or each element can have a different structure to produce a different multiplying structure of each VCSEL source element. Further, in some cases, a respective metalens structure is provided for each VCSEL element. Alternatively, a distributed metalens structure can be provided to cover multiple VCSEL elements.

The structured light projectors described here can be integrated into a wide range of small electronic devices, such as smart phones, wearables, bio devices, mobile robots, surveillance cameras, camcorders, laptop computers, and tablet computers, among others.

Various modifications can be made within the spirit of this disclosure. For example, certain features that are described in this specification in the context of separate embodiments also can be implemented in combination in the same embodiment. Conversely, various features that are described in the context of a single embodiment also can be implemented in multiple embodiments separately or in any suitable sub-combination. Accordingly, other implementations are within the scope of the claims.

What is claimed is:

1. An apparatus comprising:
a structured light projector including:
a light source;
a metalens; and
a diffractive optical element (DOE) multiplier,
wherein each of the metalens and the DOE multiplier is integrated onto the light source, and wherein the structured light projector is operable such that light beams produced by the light source pass through the metalens and the DOE multiplier.

2. The apparatus of claim 1 wherein the DOE multiplier and the metalens are disposed in different planes from one another.

3. The apparatus of claim 2 the DOE multiplier is disposed directly on an output face of the light source.

4. The apparatus of claim 2 including a spacer on the DOE multiplier, wherein the metalens is disposed on a surface of the spacer such that the spacer separates the metalens from the DOE multiplier.

5. The apparatus of claim 4 wherein the spacer is composed of an epitaxial layer.

6. The apparatus of claim 4 wherein the spacer is composed of a polymer layer.

7. The apparatus of claim 2 wherein the light source comprises one or more VCSELs.

8. The apparatus of claim 1 wherein the DOE multiplier and the metalens are disposed on a same surface as one another.

9. The apparatus of claim 8 wherein the light source comprises one or more VCSELs.

10. The apparatus of claim 1 wherein the DOE multiplier and the metalens are disposed in a same plane as one another.

11. The apparatus of claim 1 further including a spacer attached to an output face of the light source, wherein the DOE multiplier and metalens are on a surface of the spacer such that the spacer separates the DOE multiplier and metalens from the output face of the light source.

12. The apparatus of claim 11 wherein the spacer is bonded to the output face of the light source.

13. The apparatus of claim 11 wherein a lateral dimension of the metalens is less than a corresponding lateral dimension of the DOE multiplier.

14. The apparatus of claim 11 wherein an envelope profile of the metalens is the same as a two-dimensional grating profile of the DOE multiplier.

15. The apparatus of claim 11 wherein the surface of the spacer on which the DOE multiplier and metalens are disposed is larger than the output face of the light source.

\* \* \* \* \*